United States Patent [19]
Saltveit et al.

[11] Patent Number: 6,113,958
[45] Date of Patent: Sep. 5, 2000

[54] METHOD OF PREVENTING WOUND-INDUCED BROWNING IN PRODUCE

[75] Inventors: Mikal E. Saltveit; Julio G. Loaiza-Velarde, both of Davis, Calif.

[73] Assignee: The Regents of the University of California, Oakland, Calif.

[21] Appl. No.: 09/183,028

[22] Filed: Oct. 29, 1998

[51] Int. Cl.[7] ........................................................ A23L 3/00
[52] U.S. Cl. ........................... 426/270; 426/331; 426/419; 426/506; 426/511
[58] Field of Search .................................. 426/270, 331, 426/419, 506, 509, 510, 511

[56] References Cited

U.S. PATENT DOCUMENTS

| | | | |
|---|---|---|---|
| 4,168,597 | 9/1979 | Cayton | 53/127 |
| 4,224,347 | 9/1980 | Woodruff | 426/106 |
| 4,810,512 | 3/1989 | Kratky et al. | 426/270 |
| 4,855,153 | 8/1989 | Orr et al. | 426/270 |
| 4,884,388 | 12/1989 | Ventura et al. | 53/537 |
| 5,290,580 | 3/1994 | Floyd et al. | 426/524 |
| 5,858,432 | 1/1999 | Cherry et al. | 426/262 |

OTHER PUBLICATIONS

Ke, D. et al., "Wound–induced ethylene production, phenolic metabolism and susceptibility to russet spotting in iceberg lettuce", Physiologia Planatarium 76, pp. 412–418, Copenhagen 1989.

Peiser, G. et al., "Phenyalanine ammonia lyase inhibitors control browning of cut lettuce", Postharvest Biology and Technology 14, pp. 171–177, Oct. 1998.

Loaiza–Velarde, J. et al, Effect of Intensity and Duration of Heat–shock Treatments on Wound–induced Phenolic Metabolism in Iceberg Lettuce, Oct. 30, 1997, pp. 873–877, J. Amer. Soc. Hort. Sci. 122(6).

Saltveit, M., Physical and physiological changes in minimally processed fruits and vegetables, 1997, pp. 204–220, Phytochemistry Fruit and Vegetables.

Brecht, J., Physiology of Lightly Processed Fruits and Vegetables, Feb. 1995, pp. 18–22, HortScience, vol. 30(1).

Bolin, H.R. et al, Effect of Preparation Procedures and Storage Parameters on Quality Retention of Salad–cut Lettuce, 1991, Journal of Food Science—vol. 56, No. 1.

Brodl, M. et al, Heat shock in mechanically wounded carrot root disks causes destabilization of stable secretory protein mRNA and dissociation of endoplasmic reticulum lamellae, May 29, 1992, pp. 253–262, Physiologia Plantarum 86.

Collins, G., et al, Heat shock proteins and chilling sensitivity of mung bean hypocotyls, Jul. 1995, pp. 795–802, Journal of Experimental Botany, vol. 46, No. 288.

Couture, R. et al, Physiological Attributes Related to Quality Attributes and Storage Life of Minimally Processed Lettuce, Jul. 1993, pp. 723–725, HortScience vol. 28(7).

DiDomenico, B. et al, The Heat Shock Response Is Self–Regulated at Both the Transcriptional and Posttranscriptional Levels, Dec. 1982, pp. 593–603, Cell, vol. 31.

(List continued on next page.)

*Primary Examiner*—Nina Bhat
*Attorney, Agent, or Firm*—John P. O'Banion

[57] ABSTRACT

A method of preventing wound-induced browning in lettuce by applying a short thermal stress induced by immersing the lettuce in water at approximately 40° C. to approximately 60° C. for approximately 360 seconds or less. Alternatively, forced-air heating could be used if the air was at a relative humidity of near 100% to prevent water loss. After heat-shocking the lettuce, the lettuce can be vacuum cooled to effectively cool and dry the lettuce. The heat-shock effect is so persistent that lettuce will not show any browning even after being held for approximately 15 days in the air at 5° C. This treatment could eliminate the need to store fresh-cut lettuce in low oxygen, and or high carbon dioxide modified atmospheres to prevent browning during marketing. It would also allow the use of vacuum cooling to cool the processed lettuce. It would also prevent browning of cored, whole heads of lettuce.

24 Claims, 8 Drawing Sheets

OTHER PUBLICATIONS

Hoagland, R., O–Benzylhydroxylamine: An Inhibitor of Phenylpropanoid Metabolism in Plants, Aug. 6, 1985, pp. 1353–1359, Plant Cell Physiol. 26(7).

Howarth, C. et al, Tansley Review No. 51 Gene expression under temperature stress, 1993, pp. 1–26, New Phytol 125.

Dangyand, K. et al., Effects of Calcium and Auxin on Russet Spotting and Phenylalanine Ammonialyase Activity in Iceberg Lettuce, Oct. 1986, pp. 1169–1171, HortScience. vol. 21(5).

Lurie, S. et al, Reversible Inhibition of Tomato Fruit Gene Expression at High Temperature, Dec. 29, 1996, pp. 1207–1214, Plant Physiol 110.

McEvily, A., Inhibition of Enzymatic Browning in Foods and Beverages, 1992, pp. 253–273, Critical Reviews in Food Science and Nutrition, 32(3).

Mocquot, B., et al, Rice embryos can express heat—shock genes under anoxia, 1987, pp. 677–681, Biochimie, 69.

Pollock, C.J. et al, Temperature stress, Plant Adaptation To Environmental Stress, Chapman & Hall, New York. L. Fowden, T. Mansfield, and J. Stoddart (eds.).

Richard–Forget, F. et al, Cysteine as an Inhibitor of Enzymatic Browning. 2. Kinetic Studies, Aug. 10, 1992, pp. 2108–2113, J. Agric. Food Chem 40.

Ritenour, M. et al, Identification of a phenylalanine ammonia–lyase inactivating factor in harvested head lettuce (*Lactuca sativa*), Jan. 25, 1996, pp. 327–331, Physiologia Plantarum 97.

Siriphanich, J. et al., Effects of CO2 on Total Phenolics, Phenylanine Ammonia Lyase, and Polyphenol Oxidase in Lettuce Tissue, 1985, pp. 249–253, J. Amer. Soc. Hort. Sci. 110(2).

Thomas, R. et al, Changes in Soluble and Bound Peroxidase–IAA Oxidase During Tomato Fruit Development, 1981, pp. 158–161, Journal of Food Science–vol. 47.

Tomas–Barberan, F. et al, Early Wound– and Ethylene–induced Changes in Phenylpropanoid Metabolism in Harvested Lettuce, 1997, pp. 399–404, J. Amer. Soc. Hort. Sci. 122(3).

Vierling, E., The Roles of Heat Shock Proteins in Plants, 1991, pp. 579–620, Annu. Rev. Plant Physiology Plant Mol. Biol 42. Annual Reviews Inc.

Ke, D. et al, Plant Hormone Interaction and Phenolic Metabolism in the Regulation of Russet Spotting in Iceberg Lettuce, Jul. 5, 1988, pp. 1136–1140, Plant Physiol. 88.

Ke. D, et al, Regulation of Russet Spotting, Phenolic Metabolism, and IAA Oxidase by Low Oxygen in Iceberg Lettuce, 1989, pp. 638–642, J. Amer. Soc. Hort. Sci. 114(4).

Leubner–Metzger, G. et al, Phenylalanine Analogues: Potent Inhibitors of Phenylalanine Ammonia–Lyase Are Weak Inhibitors of Phenylalanine–tRNA Synthetases, 1994, pp. 781–790, Verlag der Zeitschrift fur Naturforschung.

Lopez–Galvez, G. et al, Wound–induced phenylalanine ammonia lyase activity: factors affecting its induction and correlation with the quality of minimally processed lettuces, May 18, 1996, pp. 223–233, Postharvest Biology and Technology 9.

Zon, J. et al, Inhibitors of Phenylalanine Ammonia–Lyase: 2–Aminoindan–2–phosphonic Acid and Related Compounds, 1992, pp. 625–628, Ann. Chem. VCH Verlagsgescellschaft MbH, D–6940 Weinheim.

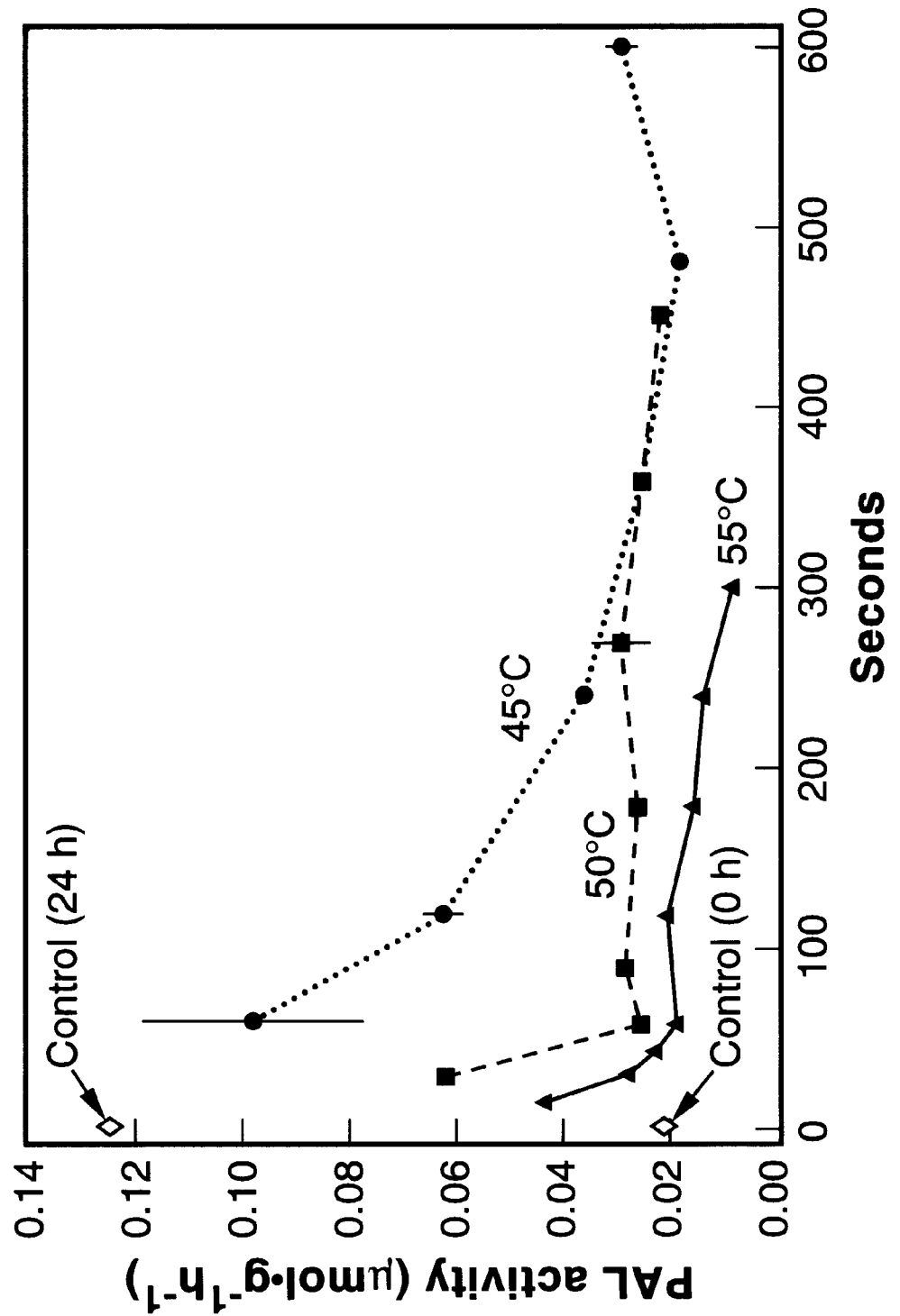
FIG. −2

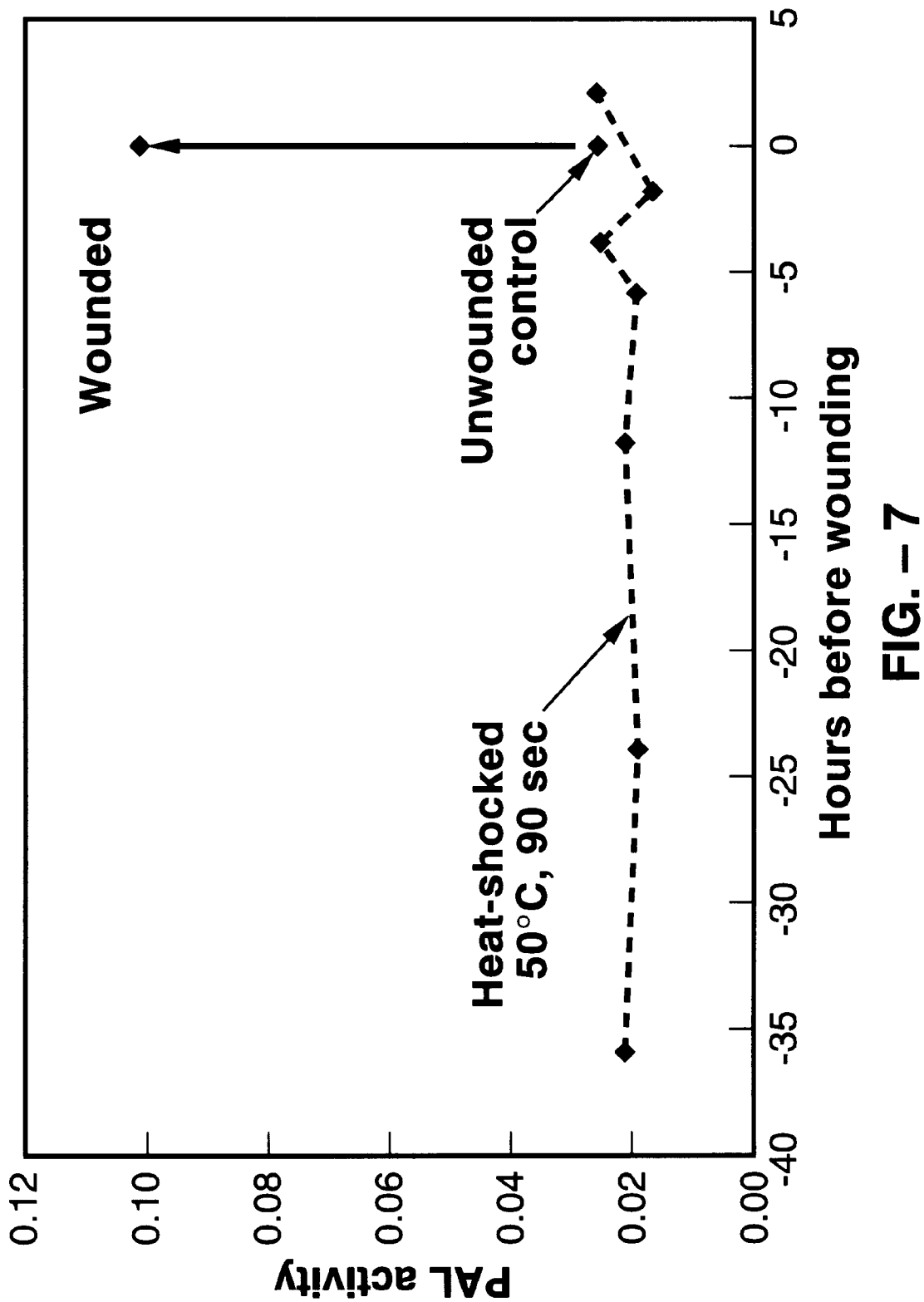
FIG. −7

METHOD OF PREVENTING WOUND-INDUCED BROWNING IN PRODUCE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to processing of fresh fruit and vegetables, and more particularly to a method of preventing browning induced by wounds to plant tissue.

2. Description of the Background Art

Browning of fresh fruits and vegetables reduces quality and is often the factor limiting shelf life and marketability. This is especially true when these horticultural commodities are wounded by cutting, peeling, or abrading the surface during the preparation of minimally processed fresh fruits and vegetables. Enzymatic and non-enzymatic reactions with phenolic compounds produce brown pigments in plant tissue. Some tissues (e.g., artichokes) contain high levels of preformed phenolic compounds and rapidly brown in the air after wounding. Preventing browning in these tissues requires deactivation of the enzymes responsible for browning (e.g., polyphenoloxidase), exclusion of oxygen (e.g., oxygen levels below 1%), or application of chemical antioxidants (e.g., ascorbic acid). In other tissue, (e.g., lettuce) the quantity of phenolic compounds in uninjured tissue is low and browning follows the enhanced synthesis and accumulation of phenolic compounds.

Wounding (e.g., cutting, cracking or breaking) of lettuce produces a signal that migrates through the tissue and induces the synthesis of enzymes in the metabolic pathway responsible for increased production of phenolic compounds. The first enzyme in the phenylpropanoid pathway is phenylalanine ammonia-lyase (PAL). Induced synthesis of this enzyme after wounding is rapidly followed by the accumulation of phenolic compounds like chlorogenic, isochlorogenic and dicaffeoyl tartaric acid, compounds that are associated with browning in lettuce.

Methods used to control the increase in phenolic metabolism that leads to browning and loss of quality of minimally processed fresh produce include the use of reducing agents, enzyme inhibitors, acidulants, and complexing agents. Some of these chemical treatments are very effective in controlling browning by interfering with specific metabolic pathways. For instance, o-benzylhydroxylamine, cysteine, and some phenylalanine analogues (e.g., 2-aminoindan-2-phosphonic acid) have been reported to reduce the activity of enzymes associated with phenylpropanoid metabolism (e.g., PAL). However, concern about the use of chemicals and their toxic nature precludes their use on many minimally processed fresh fruits and vegetables. This concern with chemical residues is eliminated by the use of low oxygen, and or high carbon dioxide controlled and modified atmospheres (CA and MA), which are treatments currently employed in the commercial packaging of minimally processed lettuce. However, the use of CA requires special equipment for handling and storage, while the use of MA requires special equipment for packaging and expensive packaging material.

Therefore, there is a need for a method that counteracts these effects and prevents browning without the use of chemicals or additives, and which is easy and inexpensive to implement. The present invention satisfies those needs, as well as others, and generally overcomes the problems associated with preventing of browning using chemicals or additives.

BRIEF SUMMARY OF THE INVENTION

The present invention solves the problem of browning in lettuce by means of heat-shock treatment. No chemicals are used in the heat-shock treatment method of the invention, and the heat-shock proteins that are produced by the lettuce are natural compounds found in many fresh fruits and vegetables that have experienced an abiotic stress. The ease with which a heat-shock can be administered to lettuce and the lack of an offensive chemical residue makes the present invention an attractive method to control browning in fresh-cut lettuce, and perhaps in other fresh fruits and vegetables as well.

By way of example, and not of limitation, browning can be prevented in iceberg lettuce according to the present invention by applying a short thermal stress. For example, a heat-shock of approximately 50° C. for approximately 90 seconds induced by immersing the lettuce in water effectively prevents the synthesis of PAL by wounded lettuce leaf tissue and its subsequent browning. This inhibition of PAL synthesis is accomplished by redirecting protein synthesis away from wound-induced proteins (e.g., PAL) to the synthesis of heat-shock proteins. The heat-shock does not act through interfering with the wound signal since it is effective when administered both 4 hours after and 36 hours before wounding. The heat-shock effect is so persistent that lettuce will not show any browning even after being held for approximately 15 days in the air at 5° C. This treatment could eliminate the need to store fresh-cut lettuce in low oxygen, and or high carbon dioxide modified atmospheres to prevent browning during marketing.

The ability of heat-shock to control browning when administered either before or after the preparation of fresh-cut lettuce greatly expands the probability of it being incorporated into commercial processing lines. A short heat-shock produced by immersion in approximately 50° C. water for approximately 90 seconds could replace the washing step between the chopping step and the centrifugation step used to remove excess water. Being warmer than the usual 0° C. of lettuce on most processing lines, water adhering to the heat-shocked lettuce would be less viscous and more easily removed by centrifugation. Alternatively, excess water could be removed by vacuum cooling. This is not possible with 0° C. lettuce, since the heat needed to vaporize the water and produce the cooling would not be there, but heat-shocked lettuce would be warm enough to take advantage of vacuum cooling. Vacuum cooling would, therefore, not only cool the processed lettuce, but it would also de-water the lettuce without subjecting it to further mechanical damage caused by commonly used centrifugation.

The heat-shock method of the present invention is effective over a temperature range of approximately 40° C. to approximately 60° C. for approximately 360 seconds or less. Additionally, as an alternative to immersing the produce in water, forced-air heating could be used if the relative humidity of the air was at 100% in order to prevent water loss in the article of produce being heat-shocked.

In addition, the produce can be vacuum cooled after being heat-shocked. Vacuum cooling warm produce after heat-shock treatment provides advantages over vacuum cooling alone, as cold produce does not possess sufficient heat to allow vaporization of the residual water. When combined with the heat-shock method of the present invention, vacuum cooling is very effective at drying the produce.

An object of the invention is to prevent browning in lettuce resulting from wounds.

Another object of the invention is to prevent browning in lettuce without the use of additives or chemicals.

Another object of the invention is to prevent browning of lettuce by using natural compounds induced in the lettuce itself by stress.

Another object of the invention is to increase the storage life of lettuce.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 2 is a graph showing the effect of duration of exposure to selected temperatures on the subsequent development during 24 hours at 10° C. of holding on phenylalanine ammonialyase (PAL, $\mu$mol cinnamic acid-g$^{-1}$h$^{-1}$) activity in excised iceberg lettuce midrib segments, where control midrib segments were assayed before treatment (0 hours) and after 24 hours at 10° C. Means±standard deviation, SD bars present only when larger than symbol.

FIG. 7 is a graph showing the effect of a 50° C. heat treatment for 90 seconds given up to 36 hours before wounding on the subsequent activity of phenylalanine ammonia-lyase (PAL) in lettuce tissue held at 5° C. for 24 hours.

DETAILED DESCRIPTION OF THE INVENTION

Figure 1A:
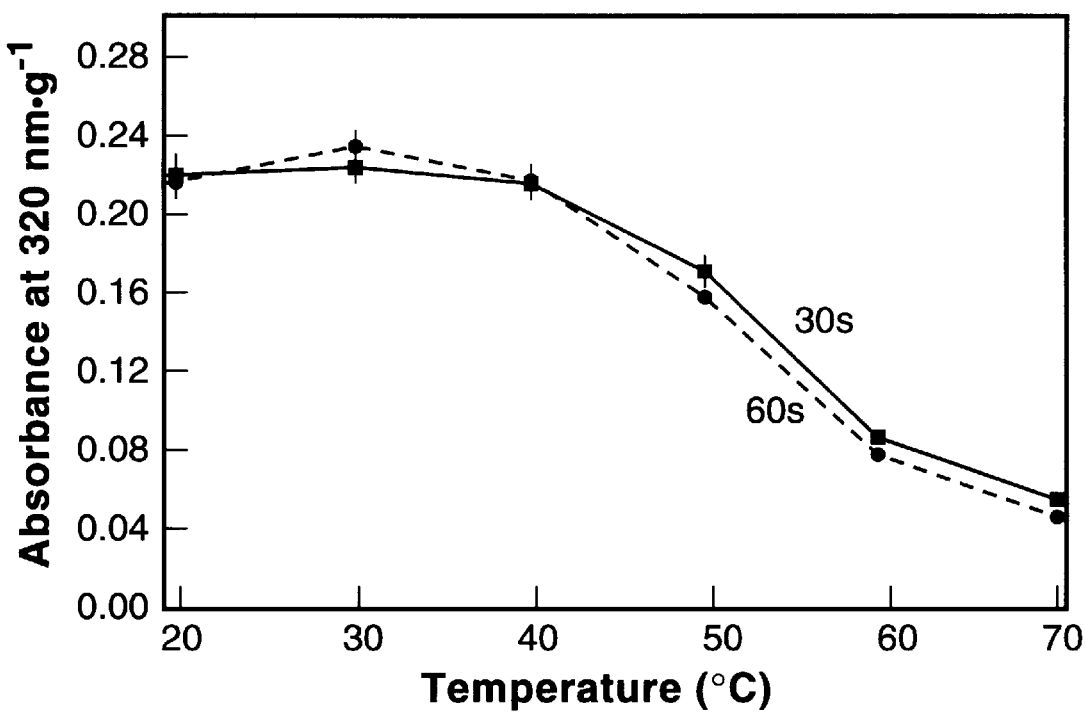
FIG. 1A and FIG. 1B are graphs showing the effect of temperature and duration of exposure on the subsequent development of browning potential (FIG. 1A) and activity of phenylalanine ammonia-lyase (PAL, $\mu$mol cinnamic acid-g$^{-1}$h$^{-1}$) (FIG. 1B) in excised iceberg lettuce midrib segments, where tissues were held at 10° C. and assayed 24 hours after the temperature treatments. Means±standard deviation, SD bars present only when larger than symbol.

Minimal processing of fresh fruit and vegetables involves many mechanical processes (e.g., abrading, cutting, peeling) which injure the tissue. Such wounding induces alterations in many physiological processes which often make the processed item more perishable than the unprocessed fresh product and diminishes the shelf life of the final minimally processed product. Wounding also elicits several physiological responses associated with wound healing. Foremost among these reactions are alterations in phenolic metabolism and the concomitant increase in the propensity of the wounded tissue to brown.

In accordance with the method of the present invention, an article of produce such as lettuce is subjected to heat-shock treatment at approximately 40° C. to 60° C. for approximately 360 seconds or less. The treatment is carried out by immersing the lettuce in a liquid heated to that temperature, which is preferably water since it has a neutral effect on the plant tissue. Additionally, use of immersion heating is preferably since it provides a uniform and thorough shock. It will be appreciated, however, that other methods of heating the lettuce could be employed provided such methods sufficiently heat the lettuce without damaging the plant tissue. On the other hand, methods such as air heating where the relative humidity is below 100% is not desirable for the reason that the lettuce will dry out. Moist-air heating, where the relative humidity is close to 100% would be effective if water loss was controlled and heating was uniform. Note also that higher temperatures and/or longer periods of treatment are undesirable as they will effectively cook the tissue, denature proteins and thereby cause irreparable damage.

EXAMPLE 1

The browning potential (absorbance at 320 nm) and the activity of phenylalanine ammonia-lyase (PAL, the first committed enzyme in phenyl propanoid metabolism) were found to increase in excised iceberg lettuce midrib segments after wounding. Iceberg lettuce (*Lactuca sativa*, L., cv. Salinas) was used in all experiments. Whole heads of lettuce were purchased from a local wholesale market the day after harvest, transported to the laboratory, and kept at 0° C. until used. After discarding wrapper leaves, the next 6 to 8 uninjured leaves were carefully removed and midrib segments, 5×7 cm, were excised starting 3 cm from the base of the leaf. In some experiments cored, whole heads were used. Randomized samples of at least 3 midribs segments or heads were used as replicates in each treatment.

Randomly selected groups of 3 excised midrib segments were immersed in a hot water bath (model 9001, Fisher Scientific) at 20 to 70° C. in 10° C. increments. The treatments were for 30 or 60 seconds. After the heat treatments, the segments were put in 10° C. water for 30 seconds. A home salad spinner was used to remove excess water. Segments were then held at 10° C. in air-tight metal boxes. A flow of ethylene-free, humidified-air was maintained at a sufficient rate to keep the $CO_2$ level below 0.15%. After 24 hours, replicated samples were assayed for PAL activity. Phenolic compounds were extracted and their absorbance measured at 320 ηm.

To determine the 'a' and 'L' values, the remnants from the filtration of the phenolic extraction were placed in a transparent, multiwell tissue culture plate. Upon drying, 'a' and 'L' values were measured with a Minolta Chroma Meter CR-200 after calibrating with a white plate (L=97.63; a=−0.53; b=2.38).

Figure 1B:
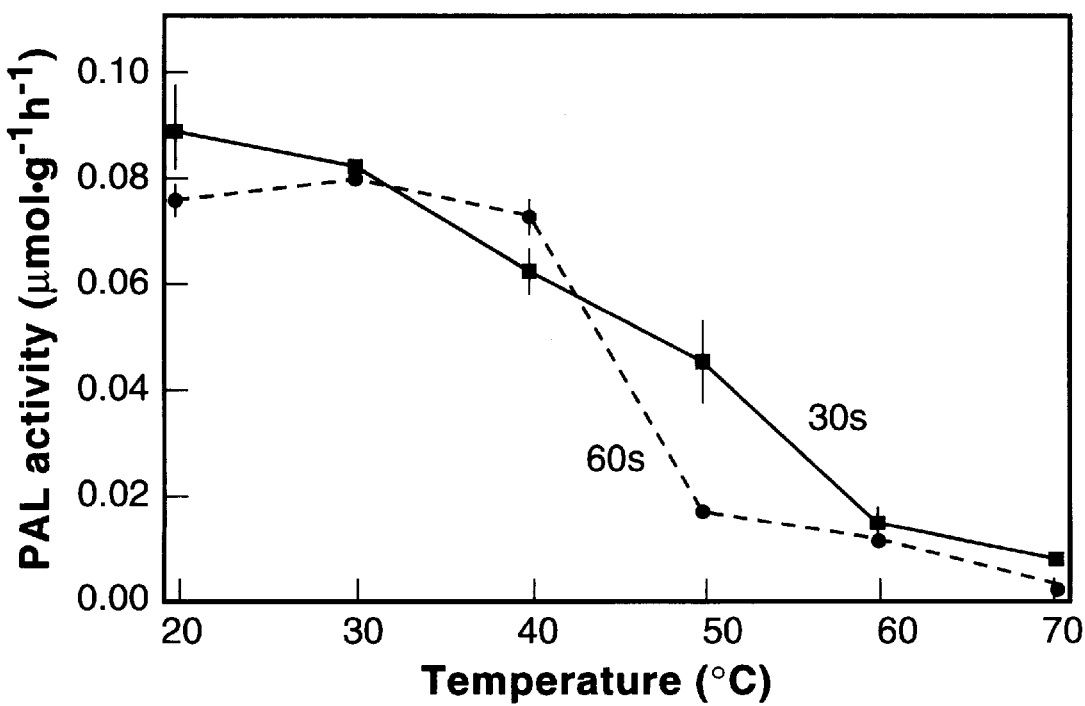

As shown in FIG. 1A, it was found that exposure to 20° C. to 40° C. for 30 seconds or 60 seconds did not produce a significant alteration in the subsequent accumulation of phenolic compounds (i.e., browning potential after 24 hours). However, increasing the temperature from 40° C. to 70° C. produced a moderately steady decrease in the absorbance at 320 nm (i.e., the maximum absorbance for caffeic acid derivatives) for both durations of exposure. A similar decline in subsequent PAL activity was observed with increasing temperature as shown in FIG. 1B. In this case, the 60 second exposure produced a steeper decline between 40° C. and 50° C. than did the 30 second exposure. Exposure to 60° C. and 70° C. for 30 seconds injured the tissue as evidenced by the lettuce tissue becoming subsequently translucent. PAL activity after the 70° C., 60 second treatment was hardly detected, which also implied extensive damage to the synthetic pathways in the tissue by these high temperatures.

EXAMPLE 2

Based on the ability of the previous heat treatments to reduce subsequent browning and PAL activity, three temperatures were selected for more detailed study. Tissue segments were subjected to 45° C. for 60 seconds to 600 seconds, 50° C. for 30 seconds to 450 second, and 55° C. for 15 seconds to 300 seconds (FIG. 2). After 24 hours, replicated samples were taken and assayed for PAL activity or frozen at −80° C. until analyzed for phenolic content.

To extract phenolic compounds, 10 g of tissue were homogenized with 20 ml of methanol (HPLC grade) using an Ultra-Turrax tissue homogenizer at moderate speed for 30 seconds. The homogenate was filtered through four layers of cheesecloth and centrifuged at 15,000 ×g for 15 minutes. The supernatant was used directly to measure the browning potential of the lettuce tissue. The absorbance of an aliquot of the supernatant was read at 320 nm with a UV-VIS recording spectrophotometer (Shimadzu UV-160A). The same supernatant was also used to prepare the extracts for the HPLC analysis to determine the concentration of phenolic compounds (e.g., chlorogenic acid, dicaffeoyl tartaric acid and isochlorogenic acid).

PAL activity was then assayed and PPO was extracted. In our studies, the buffer was 50 mM potassium phosphate (pH 6.2). PPO activity was then assayed and soluble and ionically bound POD were extracted. POD activity was then assayed using 50 mM phosphate buffer (pH 6.4), 0.1 M guaiacol, and 0.25% $H_2O_2$. The absorbance was read at 420 nm at 18° C.

As shown in FIG. 2, at each temperature from 45° C. to 50° C. to 55° C. there was a decrease in PAL activity with increasing duration of treatment. The reduction in subsequent PAL activity was also faster at the higher temperature; i.e., it took 360 seconds at 45° C. to accomplish the same reduction produced by 60 seconds at 50° C. Exposing the midribs to 55° C. for 45 seconds prevented PAL activity from increasing beyond the levels measured in the controls at the beginning of the experiment. The same effect was produced by exposure to 45° C. for 480 seconds, or to 50° C. for 60 seconds.

Figure 3:
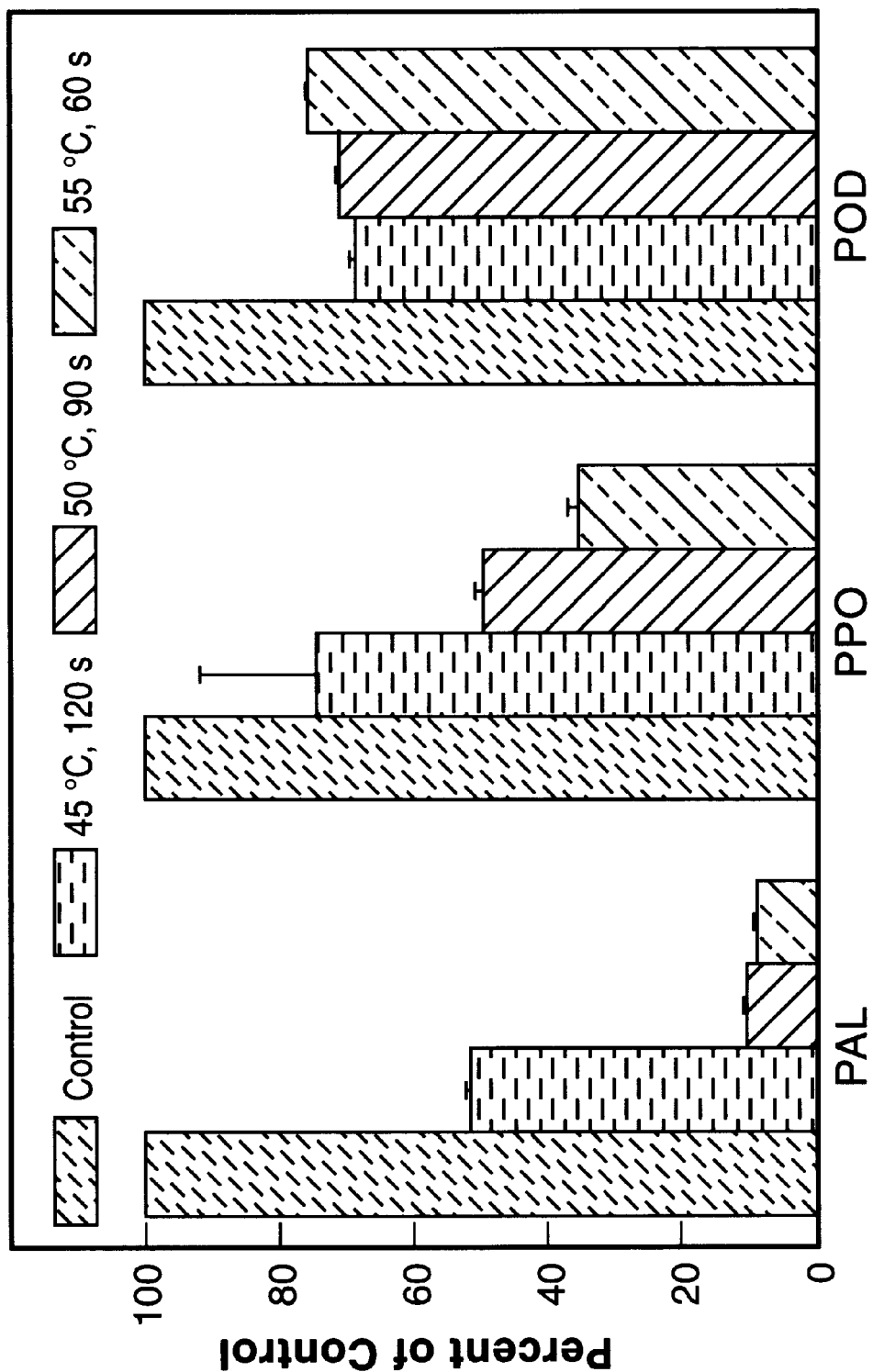
FIG. 3 is a chart showing the effect of selected time/temperature treatments on subsequent activity of phenylalanine ammonia-lyase (PAL), polyphenol oxidase (PPO) and peroxidase (POD) in excised iceberg lettuce midrib segments, where enzyme activities were assayed in tissue held at 10° C. for 24 hours after the temperature treatments and the control midribs were wounded but not heat-shocked. The line atop each bar represents the standard deviation of the mean.

Selected combinations of duration and temperature were chosen (45° C. for 120 second, 50° C. for 90 seconds, and 55° C. for 60 seconds) for subsequent experiments. PAL, PPO, and POD, (i.e., enzymes which participate in phenolic metabolism in fruits and vegetables) were analyzed individually and the results are expressed as the percentage of activity of the control after 24 hours in FIG. 3. The greatest effect of the heat treatment was on PAL activity. Temperatures of 50° C. and 55° C. reduced PAL activity around 90%. A more consistent pattern in reduction was observed for PPO activity which was reduced 25% at 45° C., 50% at 50° C. and 65% at 55° C. For POD there was a uniform decrease in activity of around 30% from the control for each of the three temperature x time treatments. Only the results for soluble peroxidase are reported; the ionically bound peroxidase was assayed but there was no significant difference among the treatments (data not shown). POD is relatively heat stable and its activity is commonly measured to determine an adequate blanching treatment for fruits and vegetables. It also participates in the formation of lignin, which is one of the latter reactions in the wound healing process. Higher temperatures or extended durations of exposure may have further reduced POD activity, but as we observed, higher temperatures also would have injured the lettuce tissue.

Figure 4A:
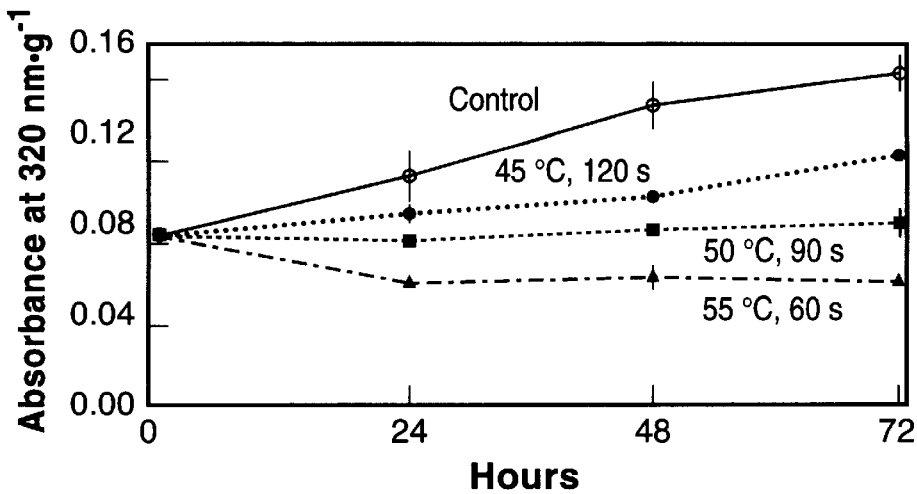
FIG. 4A through FIG. 4C are graphs showing the effect of selected time/temperature treatments on the subsequent browning of lettuce held for up to 72 hours at 10° C. as measured by the absorbance at 320 nm (FIG. 4A), change in green color as measured by the "a" value (FIG. 4B), and lightness as measured by decreases in the "L" value (FIG. 4C) of excised lettuce midrib segments. Means±standard deviation, SD bars present only when larger than symbol.
Figure 4B:
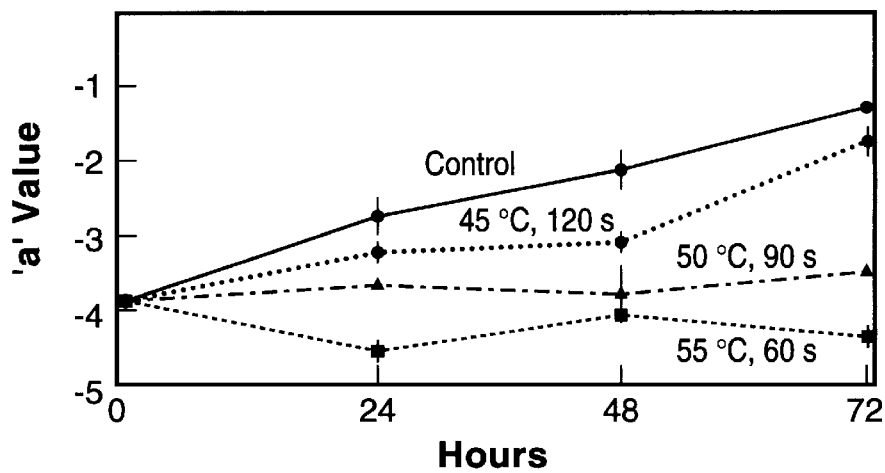
Figure 4C:
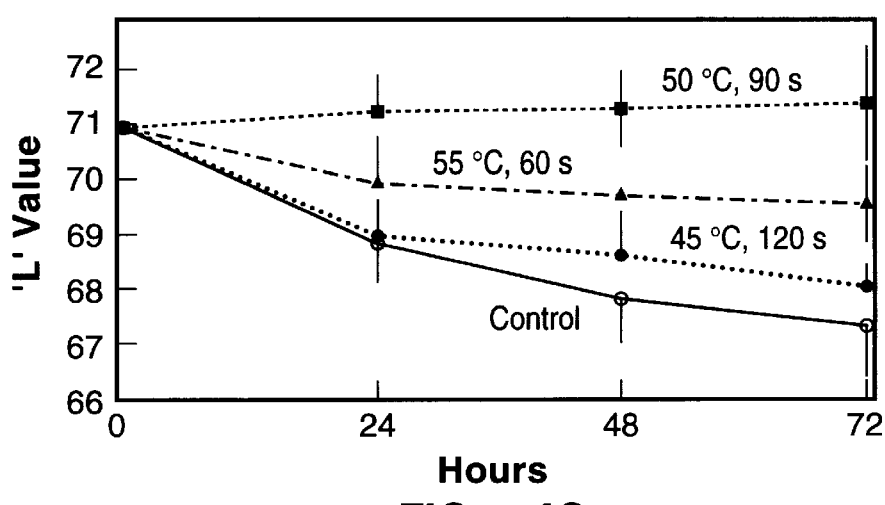

After three days, the browning potential (i.e., absorbance of the methanol extract at 320 nm) was similar to the initial value for the 50° C., 90 second treatment as shown in FIG. 4A. When treated at 55° C. for 60 seconds, the browning potential declined 25% below the initial level. This decline could be related to an interconversion of phenolic compounds since PAL activity was similar for both treatments. Even though the 55° C. for 60 second treatment was best at attenuating phenolic metabolism in lettuce, it also damaged the tissue. Tissue injury was observed when the greenness ('a' value) and lightness ('L' value) were evaluated as shown in FIG. 4B and FIG. 4C. The 'a' value is highly correlated with visual quality of lettuce. Control midribs and midribs exposed to 45° C. for 120 seconds lost greenness and became darker as shown in FIG. 4B and FIG. 4C. The 50° C. for 90 second treatment kept the greenness and lightness of the tissue over the span of the experiment. The damaging effect of the 55° C. for 60 second treatment is reflected by the lower 'L' value that was apparent after the treatment.

Figure 5:
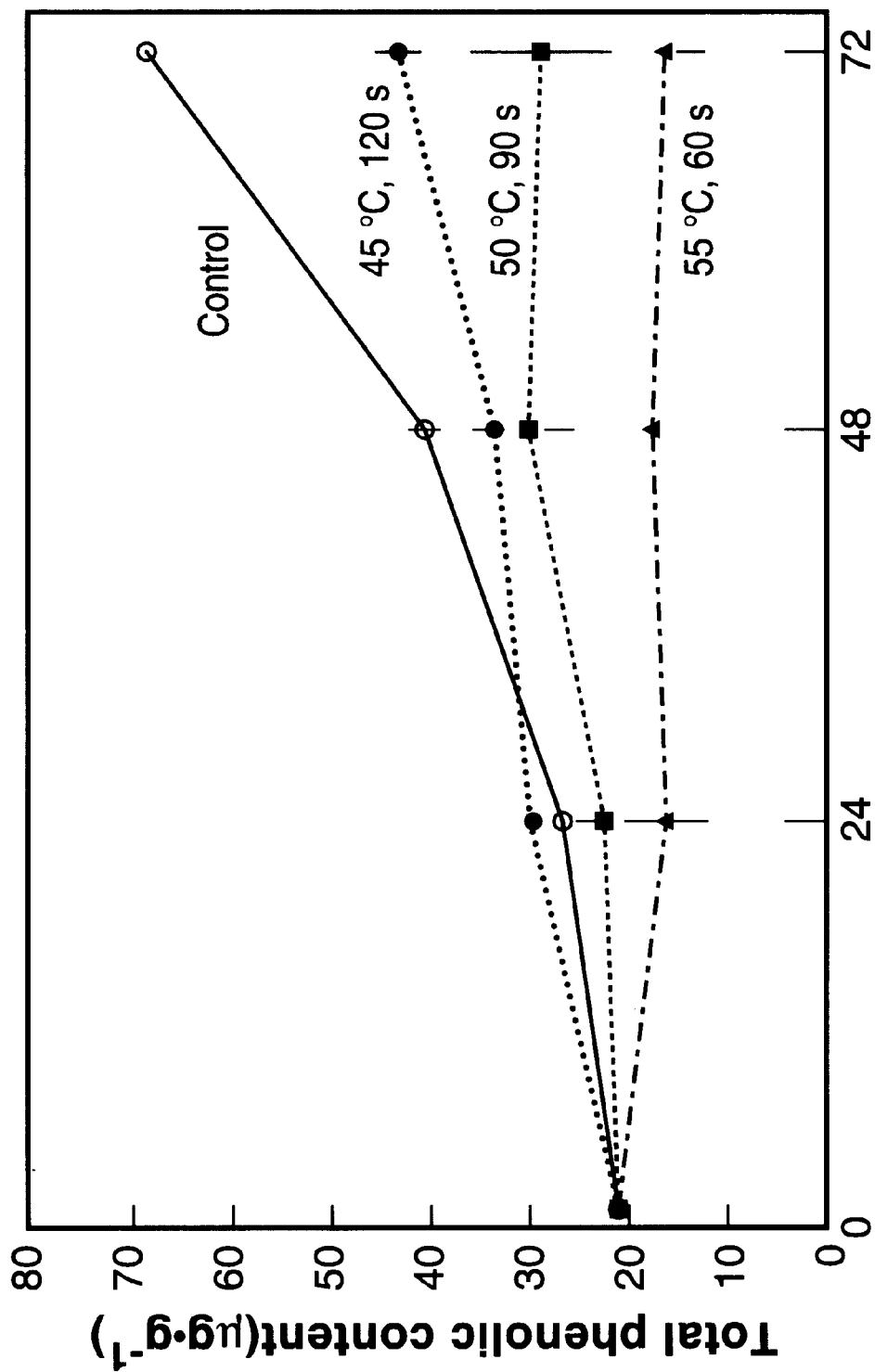
FIG. 5 is a graph showing the change in total phenolic content of excised midrib segments over time at 10° C. after exposure to 45° C. for 120 seconds, 50° C. for 90 seconds, 55° C. for 60 seconds, or continuous 10° C. (control). Means±standard deviation, SD bars present only when larger than symbol.
Figure 6A:
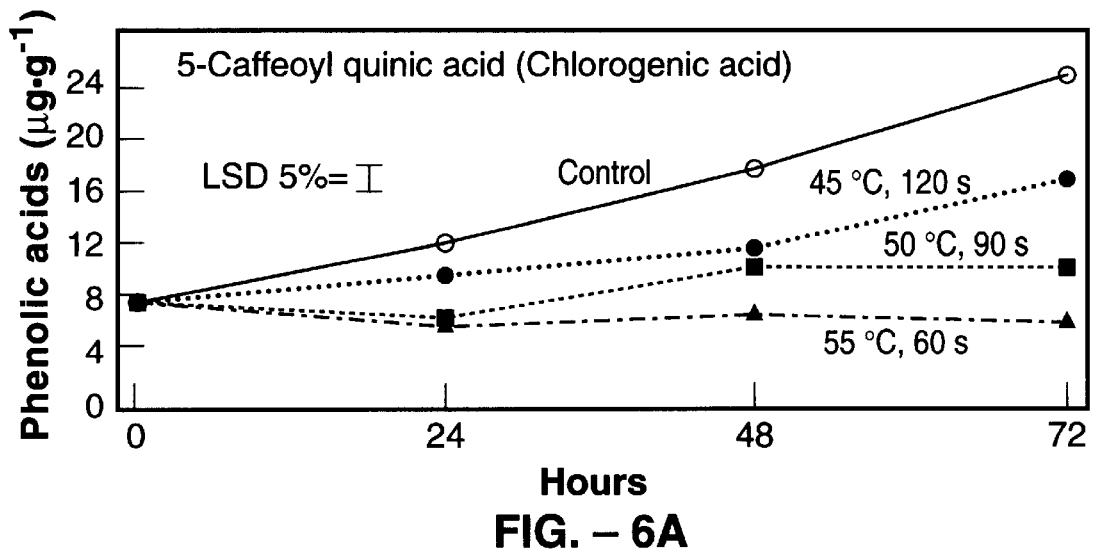
FIG. 6A through FIG. 6D are graphs graph showing the content of four caffeic acid derivatives (chlorogenic acid (FIG. 6A), isochlorogenic acid (FIG. 6B), caffeoyl tartaric acid (FIG. 6C), and dicaffeoyl tartaric acid (FIG. 6D)) in excised midrib segments of lettuce during holding at 10° C. after exposure to 45° C. for 120 seconds, 50° C. for 90 seconds, 55° C. 60 seconds, or 10° C. continuously (control). The bars represent the 5% LSD values.
Figure 6B:
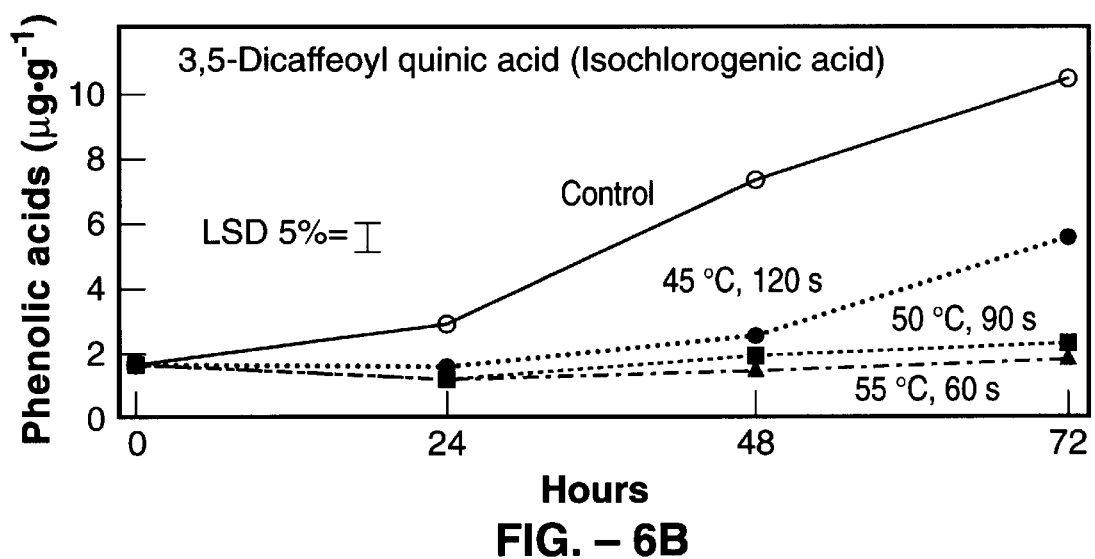
Figure 6C:
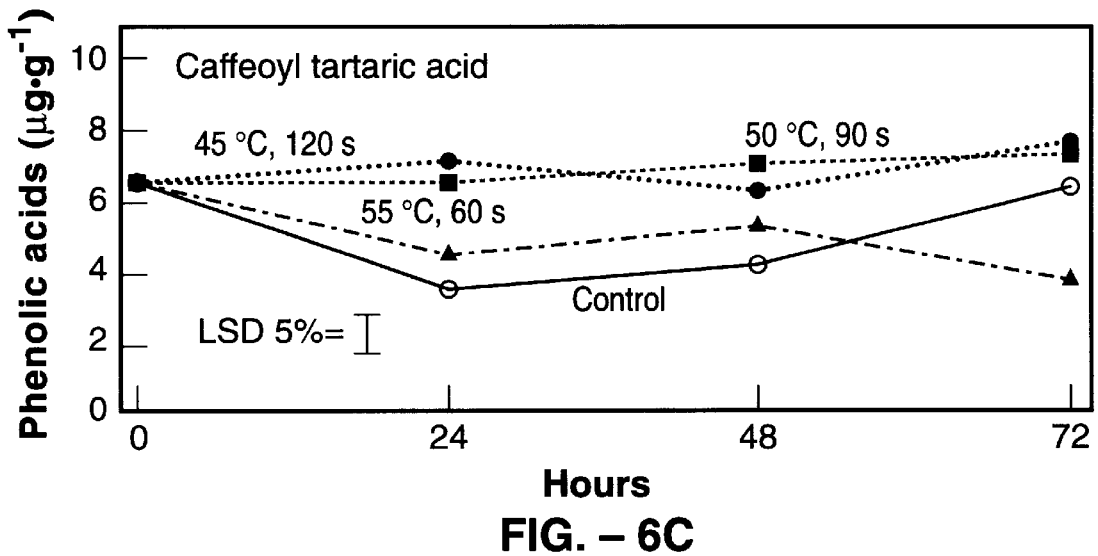
Figure 6D:
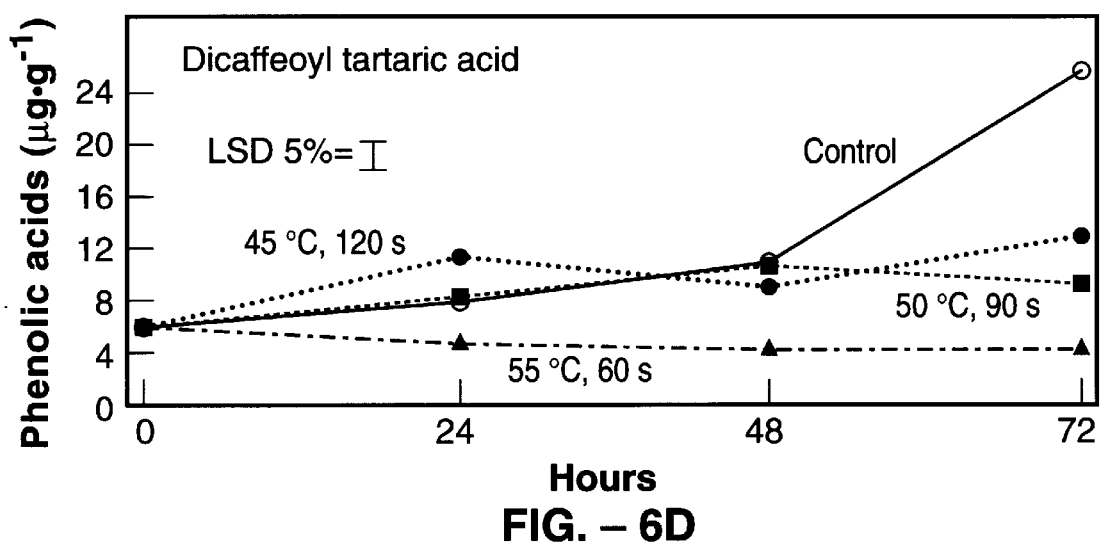

Phenolic compounds were detected as expected. Total phenolic levels (FIG. 5), and levels of 5-caffeoyl quinic acid (chlorogenic acid), 3,5-dicaffeoyl quinic acid (isochlorogenic acid), caffeoyl tartaric acid, and dicaffeoyl tartaric acid (FIG. 6A through FIG. 6D, respectively), were found to be significantly effected by the temperature treatments. In accordance with data presented in FIG. 4A, the best temperature/time treatments that reduced the increase in the concentration of phenolic compounds were found to be 50° C. for 90 seconds and 55° C. for 60 seconds. The concentration of each phenolic compound was maintained at the same or slightly lower level than at the beginning of the experiment by the 55° C. for 60 second treatment.

The main phenolic compounds were chlorogenic acid (FIG. 6A) and dicaffeoyl tartaric acid (FIG. 6D), both of which accumulated to around 25 $\mu g \cdot g^{-1}$ in the control tissue by day 3. The increase with time for both chlorogenic and isochlorogenic acid was progressively reduced by increasing temperatures. Exposure to 50° C. for 90 seconds maintained the level of these two compounds at initial levels for the duration of the experiment. The concentration of caffeoyl tartaric acid ranged from 3.5 $\mu g \cdot g^{-1}$ to 7.5 $\mu g \cdot g^{-1}$ throughout the experiment for all treatments. The levels of caffeoyl tartaric acid remained at initial levels in tissue exposed to either 45° C. for 120 seconds, or 50° C. for 90 seconds, while it decreased in tissue exposed to 55° C. for 60 seconds. This decrease was puzzling since it also initially occurred in control tissue, however, by day 3 the levels started to rise in control tissue while they showed an additional decrease in the 55° C. for 60 second treated tissue. Levels of dicaffeoyl tartaric acid were similar in all treatments for the first two days. By day 3, levels of dicaffeoyl tartaric acid had more than doubled in control tissue while they had remained roughly the same in all temperature treated tissue.

EXAMPLE 3

A heat-shock of 50° C. for 90 seconds was found to effectively prevent the synthesis of PAL by wounded lettuce leaf tissue and its subsequent browning. This inhibition of PAL synthesis is probably accomplished by redirecting protein synthesis away from wound-induced proteins (e.g., PAL) to the synthesis of heat-shock proteins. The heat-shock does not act through interfering with the wound signal since it was found to be effective when administered up to 4 hours after and 36 hours before wounding (FIG. 7). The heat-shock effect of treatment in accordance with the present invention was found to be so persistent that lettuce will not show any browning even after being held for approximately 15 days in the air at 5° C. This treatment could eliminate the need to store fresh-cut lettuce in low oxygen, and/or high carbon dioxide modified atmospheres to prevent browning during marketing.

EXAMPLE 4

Based on the ability of the previous heat treatments to reduce subsequent PAL activity, whole, cored heads were treated at 50° C. for 90 second. The core (i.e., the stem and ~0.5 cm of attached leaf bases) and was removed with a sharp knife as is commercially done during field harvesting. Replicated samples were cored and heat treated or not, and then periodically observed for 14 days at 5° C. After 7 days browning was detected in damaged outer leaves and cut tissue in the cored lettuce. The temperature treatment effectively prevent browning of both damaged outer leaves and cut tissue in the core. Slight browning was apparent after 2 weeks in the heat treated lettuce, while the control heads were unmarketable by that time.

Discussion of Experimental Results

The recovery of normal protein synthesis following a heat-shock is dependent upon the severity (i.e., temperature and time of exposure) of the heat-shock. Although the length of exposure to the heat treatments significantly influenced phenolic metabolism, the most pronounced effect was caused by the temperature of the treatments, not the length of exposure (FIG. 2). Upon return to normal growth temperatures, the synthesis of hsps should continue longer in tissue exposed to higher sub-lethal temperature than to lower temperatures because of greater level of induction.

Wounding is a common abiotic stress which induces altered protein synthesis in minimally processed fruits and vegetables. Even slight mechanical injury induces the synthesis of enzymes responsible for ethylene biosynthesis in plants. The wounding of lettuce tissue induces the de novo synthesis of PAL, which initiates the reactions that lead to an increase in the level of phenolic compounds and browning.

If plant tissues show a hierarchical response to different abiotic stresses, then it would be possible to redirect the synthesis of proteins in lightly processed lettuce away from those related to wounding to those related to heat-shock. In this way, the synthesis of enzymes that participate in wound-induced phenylpropanoid metabolism would be partially or completely repressed in favor of hsps, and the browning of cut lettuce would consequently be reduced. The activities of PAL and PPO, two of the major enzymes responsible for browning, were affected by increasing temperatures in the heat treatments (i.e., 45<50<55° C.). Data presented on browning (FIG. 4) and on the accumulation of phenolic compounds (FIG. 5 and FIG. 6A through FIG. 6D) are consistent with the proposal that heat-shock represses the synthesis of wound-induced enzymes of phenylpropanoid metabolism and favors the synthesis of hsps. The use of a stress which induces innocuous changes to circumvent the objectionable effects of another stress may be a useful technique worth developing for a number of other applications.

Additional Steps for Enhanced Processing

As described above, the heat-shock method of the present invention significantly reduces the subsequent production of phenolic compounds and browning of minimally processed lettuce. However, the heat-shock treatment results in warm, wet lettuce that must be cooled and dried before packaging. To address this problem, the invention further includes the steps of using vacuum cooling as an efficient method to cool and remove water from lettuce.

In accordance with this aspect of the invention, field packed lettuce would be vacuum cooled to approximately 0° C. under a vacuum of approximately 4.6 mm Hg. During this cooling, sufficient water is vaporized to cause the loss of about 4% to 6% of the fresh weight of the lettuce. Water contains 1 cal/g° C., and the latent heat of vaporization of water is 540 cal/g. The vapor pressure of water at 0° C. is 4.58 mm Hg. Therefore, under a vacuum of 4.58 mm Hg, water will continually vaporize until its temperature is 0° C.

Warm water is less viscous than cold water and more warm water than cold water will drain from lightly processed lettuce (2 cm×0.5 cm strips). Water weighing about 20% of the fresh mass of lightly processed lettuce is retained on lettuce at 0° C., while only 11% is retained by lettuce at 50° C. Drained wet lettuce at 50° C. will retain ~11% of the fresh mass as water or about 11 g/100 g of lettuce. Cooling 100 g of lettuce from 50° C. to 0° C. requires the removal of 50×1×100=5,000 cal. Removal of 5,000 cal requires the vaporization of 9.3 g of water per 100 g of lettuce (5,000/540). Vaporization of all 11 g of water remaining on the lettuce after cutting, washing and heat-shocking would remove 5,940 cal, which, if the vacuum was sufficiently low (below 4.5 mm Hg), could cause the lettuce to freeze before all the water was lost. The 1.7 g of water (11.0 g minus 9.3 g) remaining on the lettuce will help maintain its firmness and prevent drying during marketing.

Vacuum cooling warm lettuce after heat-shock treatment provides advantages over vacuum cooling alone. Fresh-cut lettuce is currently washed in cold water after cutting and then spun in large centrifuges to remove excess water. The large centrifugal forces needed to extract the cold water causes mechanical damage to the already cut lettuce pieces. This additional mechanical damage enhances PAL activity and the browning of fresh cut lettuce. While the centrifugal step could be eliminated by vacuum cooling the lettuce, cold lettuce does not possess sufficient heat to allow vaporization of the residual water. However, when combined with the heat-shock method of the present invention, vacuum cooling is very effective at drying the lettuce.

Accordingly, it will be seen that this invention provides a method of preventing browning in lettuce that induces a natural PAL inhibitor and/or redirects protein synthesis. Wound-induced changes in phenolic metabolism could be eliminated by redirecting protein synthesis away from the production of enzymes associated with phenolic metabolism (e.g., PAL) to the synthesis of heat-shock proteins. It appears that there is a hierarchical response in tissue to a number of abiotic stresses, with the production of heat-shock proteins superseding the wound-induction of enzymes associated with phenolic metabolism. Furthermore, by vacuum cooling the lettuce after heat-shock treatment will more effectively remove water from the lettuce than without heat-shock treatment.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method of preventing wound-induced browning in an article of produce, comprising the steps of subjecting said article of produce to heat-shock at a temperature between approximately 40° C. and approximately 50° C. for approximately 360 seconds or less, wherein production of wound-induced enzymes is inhibited, and wherein heat-shock proteins are produced.

2. A method as recited in claim 1, further comprising the step of immersing said article of produce in a liquid heated to said specified temperature range.

3. A method as recited in claim 1, wherein said liquid is water.

4. A method as recited in claim 1, further comprising the step of heating said article of produce to said specified temperature range by forced-air heating.

5. A method as recited in claim 1, wherein said forced-air has a relative humidity of approximately 100% to prevent water loss in said article of produce.

6. A method as recited in claim 1, further comprising the step of vacuum cooling said article of produce after said heat-shock.

7. A method as recited in claim 6, wherein said article of produce is vacuum cooled to approximately 0° C.

8. A method as recited in claim 7, wherein said vacuum cooling occurs under a vacuum of approximately 4.6 mm Hg.

9. A method of preventing wound-induced browning in an article of produce, comprising the steps of immersing said article of produce in water at a temperature between approximately 40° C. and approximately 50° C. for approximately 360 seconds or less, wherein production of wound-induced enzymes is inhibited, and wherein heat-shock proteins are produced.

10. A method as recited in claim 9, further comprising the step of vacuum cooling said article of produce after said heat-shock.

11. A method as recited in claim 10, wherein said article of produce is vacuum cooled to approximately 0° C.

12. A method as recited in claim 11, wherein said vacuum cooling occurs under a vacuum of approximately 4.6 mm Hg.

13. A method of preventing wound-induced browning in an article of produce, comprising the steps of subjecting said article of produce to forced-air heating at a temperature between approximately 40° C. and approximately 50° C. for approximately 360 seconds or less wherein said forced air has a relative humidity of approximately 100% to prevent water loss in said article of produce, wherein production of wound-induced enzymes is inhibited, and wherein heat-shock proteins are produced.

14. A method as recited in claim 13, further comprising the step of vacuum cooling said article of produce after said heat-shock.

15. A method as recited in claim 14, wherein said article of produce is vacuum cooled to approximately 0° C.

16. A method as recited in claim 15, wherein said vacuum cooling occurs under a vacuum of approximately 4.6 mm Hg.

17. A method of preventing wound-induced browning in lettuce, comprising the steps of immersing said lettuce in water at a temperature between approximately 45° C. and approximately 50° C. for approximately 90 seconds or less without damaging the lettuce, wherein production of wound-induced enzymes is inhibited, and wherein heat-shock proteins are produced.

18. A method as recited in claim 17, further comprising the step of vacuum cooling said article of produce after said heat-shock.

19. A method as recited in claim 18, wherein said article of produce is vacuum cooled to approximately 0° C.

20. A method as recited in claim 19, wherein said vacuum cooling occurs under a vacuum of approximately 4.6 mm Hg.

21. A method of preventing wound-induced browning in lettuce, comprising the steps of subjecting said lettuce to forced-air heating at a temperature between approximately 45° C. and approximately 50° C. for approximately 90 seconds or less without damaging the lettuce, wherein said forced-air has a relative humidity of approximately 100% to prevent water loss in said lettuce, wherein production of wound-induced enzymes is inhibited, and wherein heat-shock proteins are produced.

22. A method as recited in claim 21, further comprising the step of vacuum cooling said article of produce after said heat-shock.

23. A method as recited in claim 22, wherein said article of produce is vacuum cooled to approximately 0° C.

24. A method as recited in claim 23, wherein said vacuum cooling occurs under a vacuum of approximately 4.6 mm Hg.

* * * * *